United States Patent
Tanaka

(10) Patent No.: US 7,518,675 B2
(45) Date of Patent: Apr. 14, 2009

(54) METHOD OF MANUFACTURING LIQUID CRYSTAL DISPLAY DEVICE

(75) Inventor: Hideo Tanaka, Kobe (JP)

(73) Assignee: TPO Hong Kong Holding Limited, Shatin, Hong Kong SAR (CN)

( * ) Notice: Subject to any disclaimer, the term of this patent is extended or adjusted under 35 U.S.C. 154(b) by 322 days.

(21) Appl. No.: 10/572,839

(22) PCT Filed: Sep. 17, 2004

(86) PCT No.: PCT/IB2004/051784

§ 371 (c)(1),
(2), (4) Date: Mar. 21, 2006

(87) PCT Pub. No.: WO2005/029169

PCT Pub. Date: Mar. 31, 2005

(65) Prior Publication Data

US 2007/0052885 A1    Mar. 8, 2007

(30) Foreign Application Priority Data

Sep. 22, 2003    (WO) ................ PCT/IB03/04248

(51) Int. Cl.
*G02F 1/1335*    (2006.01)
(52) U.S. Cl. ..................... 349/113; 349/187
(58) Field of Classification Search ........... 349/113
See application file for complete search history.

(56) References Cited

U.S. PATENT DOCUMENTS

| | | | | |
|---|---|---|---|---|
| 5,949,507 A | * | 9/1999 | Shimada et al. | 349/113 |
| 7,176,994 B2 | * | 2/2007 | Maeda et al. | 349/113 |
| 2002/0063825 A1 | | 5/2002 | Sakurai et al. | |
| 2002/0101556 A1 | | 8/2002 | Kikkawa et al. | |
| 2002/0158995 A1 | | 10/2002 | Hwang et al. | |
| 2002/0159010 A1 | | 10/2002 | Maeda et al. | |
| 2003/0086036 A1 | * | 5/2003 | Yang et al. | 349/113 |

OTHER PUBLICATIONS

PCT International Search Report of Counterpart PCT Application No. PCT/IB2004/051784.

* cited by examiner

*Primary Examiner*—Richard H Kim
(74) *Attorney, Agent, or Firm*—Liu & Liu

(57) ABSTRACT

A method of the present invention includes the steps of forming an organic material film having projections and depressions, using a photo-embossing material, on an insulating film on an underlying electrode in a thin-film transistor of an active-matrix liquid crystal display device; exposing the insulating film in a contact-hole-forming-area by reducing a thickness of the organic material film by a dry etching to said organic material film; forming a contact hole and exposing the underlying by a dry etching to the exposed insulating film; and contacting the exposed underlying electrode with a reflective electrode by forming the reflective electrode on the resulting structure.

19 Claims, 4 Drawing Sheets

[Fig. 1]
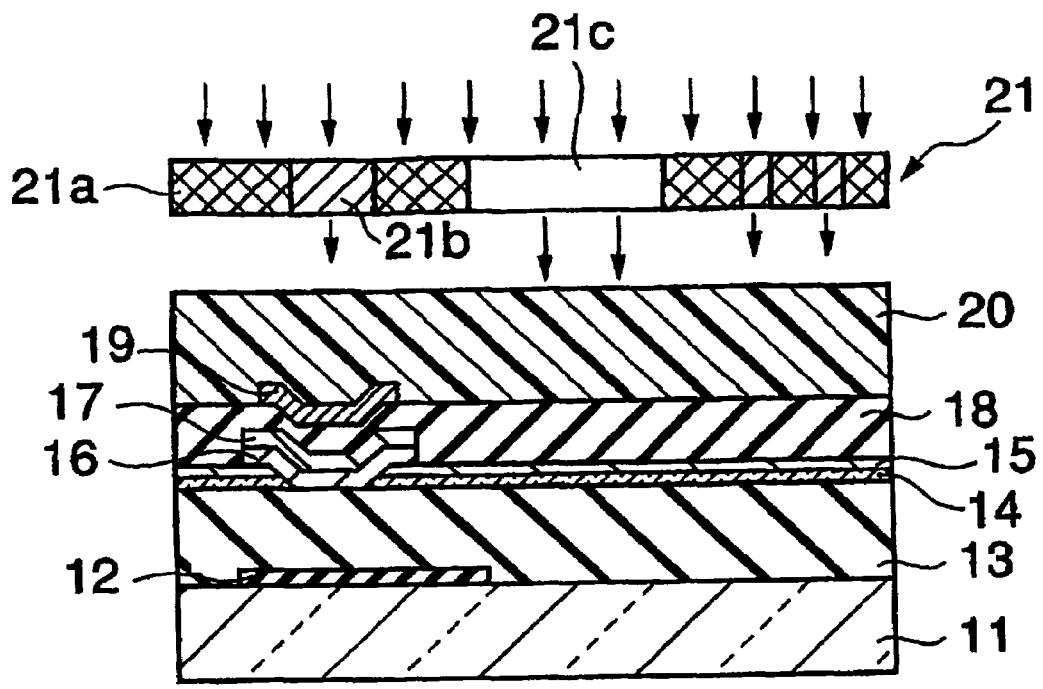
[Fig. 2]
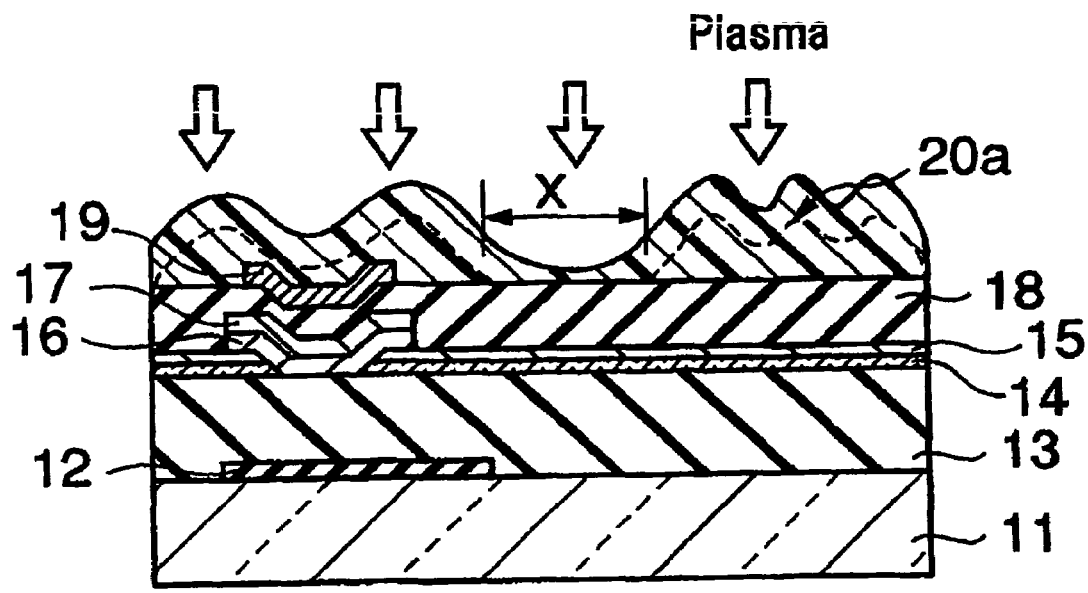

[Fig. 3]
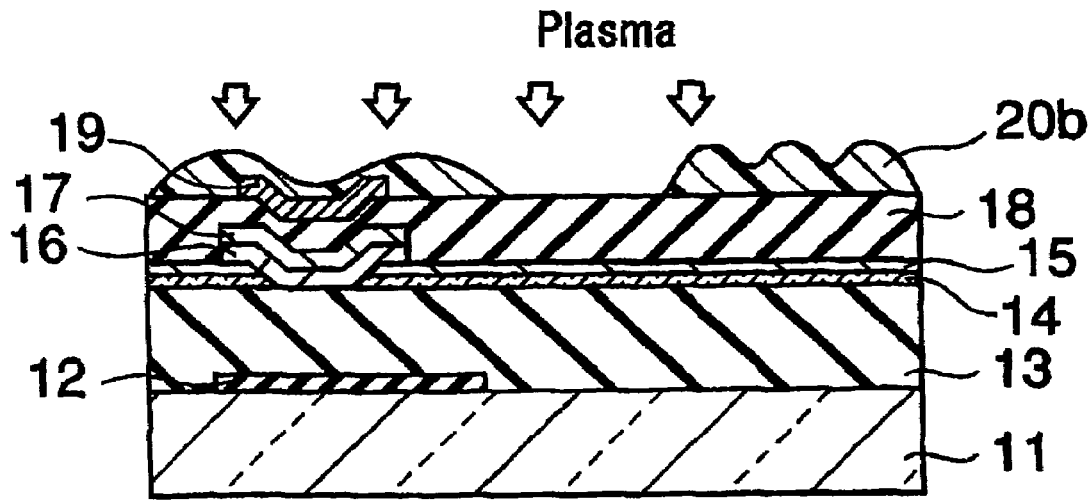
[Fig. 4]
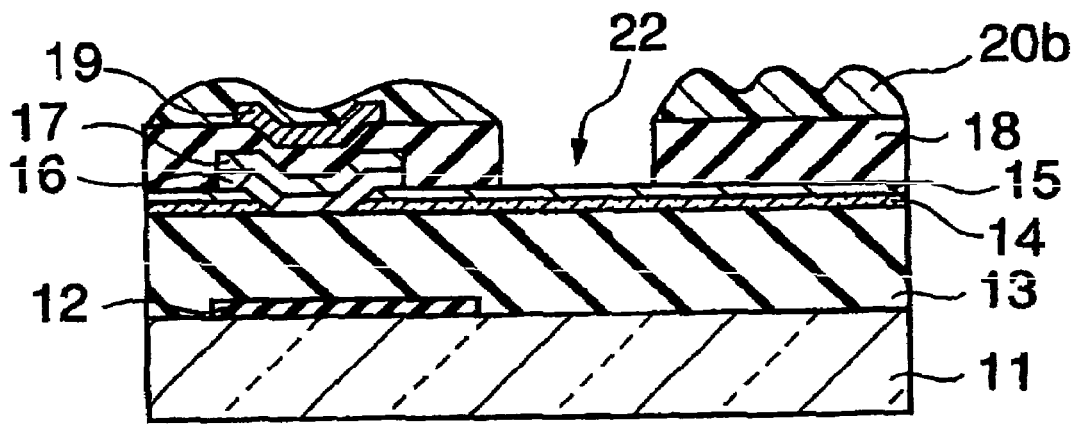
[Fig. 5]
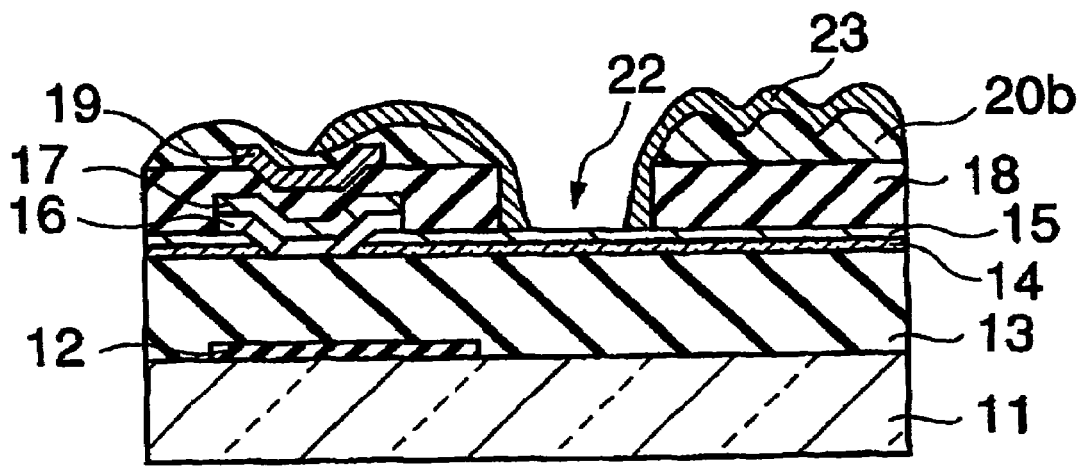

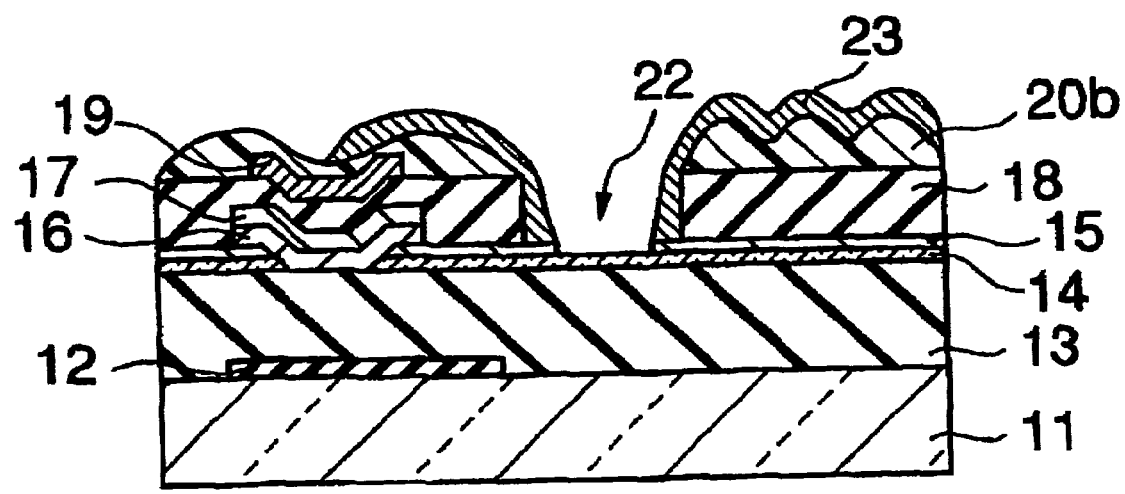
[Fig. 6]
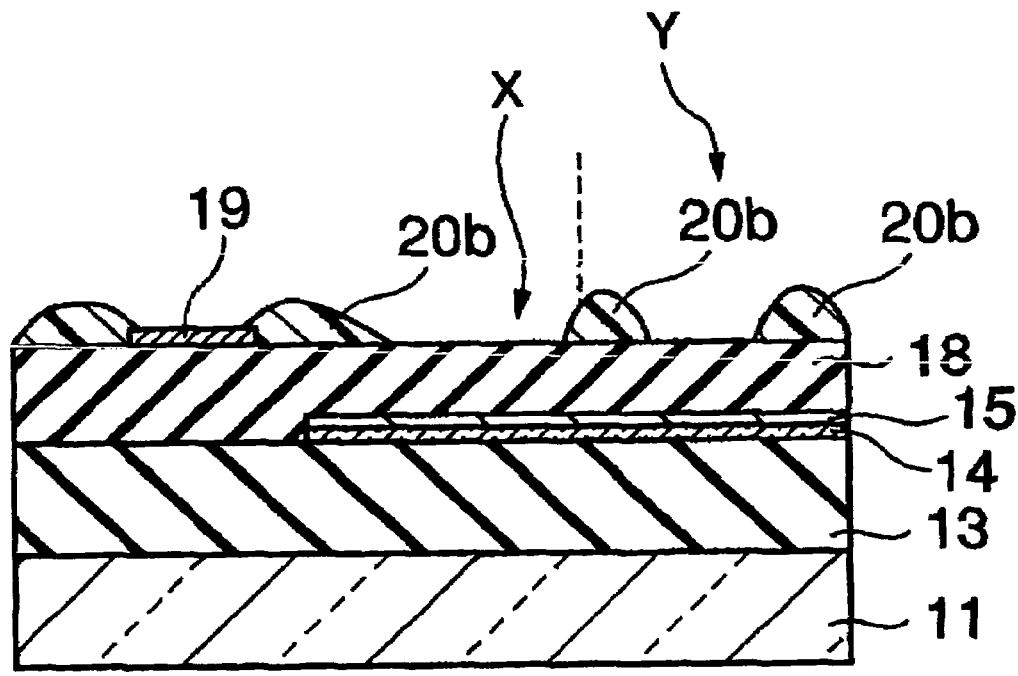
[Fig. 7]

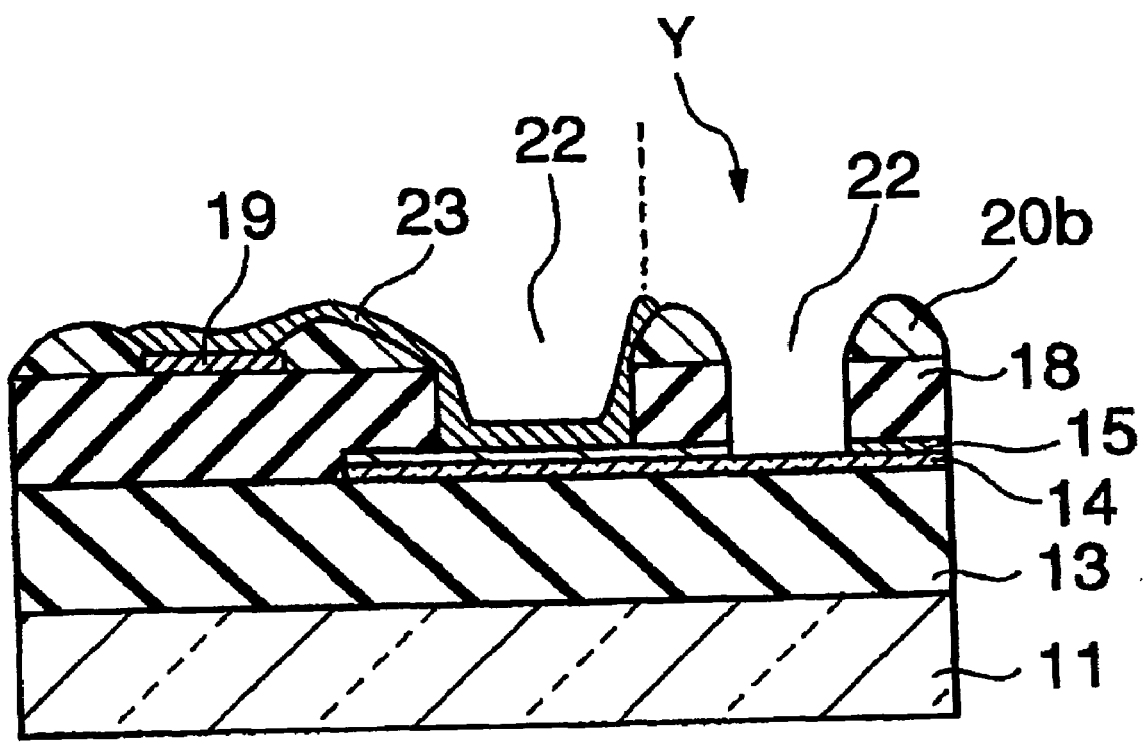
[Fig. 8]

METHOD OF MANUFACTURING LIQUID CRYSTAL DISPLAY DEVICE

TECHNICAL FIELD

The present invention relates to a method of manufacturing a liquid crystal display device, in particular to a method of manufacturing a liquid crystal display device exhibiting an improved optical characteristic without increasing photolithography steps.

BACKGROUND ART

In order to improve an optical diffusion characteristic of a reflective electrode in an active matrix type of liquid crystal display device, an organic film having projections and depressions is formed as an underlying film of the reflective electrode of a pixel area and the reflective electrode is formed thereon (IDR: In-cell Diffusing Reflector). When a contact hole is formed on a gate insulating film of a thin-film transistor (TFT), after the TFT is formed, projections and depressions are formed for the IDR in the reflective area in a photolithography step, and then the contact hole is formed on the gate insulating film using a mask for forming a contact hole in a photolithography step and an etching step.

However, the above described method requires two photolithography steps of forming IDR projections and depressions and forming a contact hole. This is not., desirable from the standpoint of mask saving (reduction of photolithography steps).

DISCLOSURE

It is an object of the present invention to provide a method of manufacturing a liquid crystal display device which is able to obtain a liquid crystal display device exhibiting an improved optical characteristic without increasing photolithography steps.

The method of manufacturing a liquid crystal display device according to the present invention is characterized by including a step of forming an organic material film having projections and depressions, using a photo-embossing material, on an insulating film on an underlying electrode in a thin-film transistor of an active-matrix liquid crystal display device, a step of exposing the insulating film in a contact-hole-forming-area by reducing a thickness of the organic material film due to a dry etching to the organic material film and a step of forming a contact hole by dry etching the exposed insulating film.

According to this method, it is possible to realize patterning through exposure and baking without development. This makes it possible to realize steps from the step of forming an organic film to the step of forming a contact hole without any wet processes. This eliminates the necessity for the steps of cleaning and drying which require the developing step, and can improve throughput. Furthermore, this method eliminates the necessity for the photolithography step for forming a contact hole, thus the steps are not complicated.

The method of manufacturing a liquid crystal display device according to the present invention preferably comprises a step of exposing the underlying electrode in forming the contact hole and a step of contacting the exposed underlying electrode with a reflective electrode by forming the reflective electrode on the resulting structure.

In the method of manufacturing a liquid crystal display device according to the present invention, the photo-embossing material is preferably a material patternable by an exposing step and a baking step. In this case, the organic material film is preferably formed by exposing and baking the photo-embossing material in forming the organic material film. Furthermore, in this case, a halftone mask or a diffraction mask is preferably used in exposing.

In the method of manufacturing a liquid crystal display device according to the present invention, the dry processes are preferably performed from the step of forming the organic material film to the step of forming the contact hole. Furthermore, in the method of manufacturing a liquid crystal display device according to the present invention, the step of exposing the insulating film and the step of forming the contact hole are preferably performed in a single apparatus.

In the method of manufacturing a liquid crystal display device according to the present invention, a dry etching process in the step of exposing the insulating film is preferably performed in an Inductively Coupled Plasma mode or a reactive ion etching mode.

In the method of manufacturing a liquid crystal display device according to the present invention, the liquid crystal display device is preferably a reflective type of liquid crystal display device or a transflective type of liquid crystal display device.

DESCRIPTION OF DRAWINGS

FIG. 1 is a sectional view showing a step of a method of manufacturing a liquid crystal display device according to Embodiment 1 of the present invention;

FIG. 2 is a sectional view showing a step of the method of manufacturing a liquid crystal display device according to Embodiment 1 of the present invention;

FIG. 3 is a sectional view showing a step of the method of manufacturing a liquid crystal display device according to Embodiment 1 of the present invention;

FIG. 4 is a sectional view showing a step of the method of manufacturing a liquid crystal display device according to Embodiment 1 of the present invention;

FIG. 5 is a sectional view showing a step of the method of manufacturing a liquid crystal display device according to Embodiment 1 of the present invention;

FIG. 6 is a sectional view showing a liquid crystal display device obtained by the method of manufacturing a liquid crystal display device according to Embodiment 1 of the present invention;

FIG. 7 is a sectional view showing a step of a method of manufacturing a liquid crystal display device according to Embodiment 2 of the present invention; and FIG. 8 is a sectional view showing a step of the method of manufacturing a liquid crystal display device according to Embodiment 2 of the present invention.

BEST MODE

With reference now to the attached drawings, embodiments of the present invention will be explained in detail below.

EMBODIMENT 1

This embodiment will describe a case where a reflective electrode and source/drain electrodes (underlying electrode) are connected through a contact hole.

FIG. 6 is a sectional view showing a part of a liquid crystal display device obtained by a method of manufacturing a liquid crystal display device according to Embodiment 1 of the present invention. Hereinafter, a case where the liquid crystal display device is of a transflective type will be explained. The parts explained below are areas close to a gate electrode and a gate insulating film of an active matrix type of liquid crystal display device. Therefore, explanations of other parts which have no direct bearing on the present invention are omitted. The structures of these other parts are substantially similar to the conventional structures.

On one principal surface of a glass substrate 11 which is an insulating transparent substrate is a light shield film 12 which prevents light from directly entering a TFT. This light shield film 12 is formed in an area on the glass substrate corresponding to an area including an area (gap) between a source electrode and a drain electrode. A silicon oxide film (e.g., $SiO_2$) 13 which is an inter-layer insulating film is formed on the glass substrate 11 on which the light shield film 12 is formed. Here, it is also possible to use a quartz substrate or a transparent plastic substrate instead of the glass substrate. When the liquid crystal display device is of a transflective type, such an insulating transparent substrate may be used, but when the liquid crystal display device is of a reflective type, a silicon substrate may also be used. In the case of a reflective type of liquid crystal display device, no light shield film is required.

A source electrode and a drain electrode are formed on the silicon oxide film 13. The source electrode and the drain electrode each have a double-layer structure of an ITO film 14 and a metal film 15 formed on the ITO film 14, both of which are transparent electrodes. The source electrode and the drain electrode are not limited to the double-layer structure and may also have a one-layer or a three-layer structure. A gap is formed between the source electrode and the drain electrode, and an a-Si film 16 which is a semiconductor film is formed on the gap and on the source electrode and the drain electrode around the gap.

A silicon nitride film (e.g., SiN) 17 which is a gate insulating film is formed on the a-Si film 16. A silicon nitride film 18 which is a gate insulating film is formed on the a-Si film 16, a silicon nitride film 17, and a source electrode and a drain electrode. A contact hole 22 is formed in this silicon nitride film (e.g., SiN) 18. Now, the case where the gate insulating film has a double-layer structure of the silicon nitride films 17, 18, but the gate insulating film may also have a one-layer structure.

In the area including the gap of the silicon nitride film 18, a gate electrode 19 is formed. An IDR organic material film 20b is formed on a reflective area (in which a reflective electrode is provided) having such a structure. A photo-embossing material described in EP Patent Application No. 03102200.7 of the present applicant is used as the material of this organic material film 20b. Projections and depressions are formed on the surface of this organic material film 20b to provide the reflective electrode with a light diffusing capacity. A reflective electrode 23 is formed on the reflective area of the organic material film 20b. This reflective electrode 23 is also formed on the side wall of the contact hole 22. In the contact hole 22, the metal film 15 other than the portion covered with the reflective electrode 23 is removed and the ITO film 14 is exposed. The material of the gate electrode 19 and the reflective electrode 23 is a commonly used material.

In the liquid crystal display device having such a structure, the organic material film 20b having an IDR structure has an uneven shape, and therefore the organic material film 20b can exhibit sufficient optical effects using the IDR.

Next, the method of manufacturing the liquid crystal display device according to Embodiment 1 of the present invention will be explained using FIGS. 1 to 6. FIGS. 1 to 6 are sectional views showing steps of the method of manufacturing a liquid crystal display device according to Embodiment 1 of the present invention.

As shown in FIG. 1, a chromium molybdenum film as an example is coated on the glass substrate 11 and the light shield film 12 is formed by leaving only the chromium molybdenum film of the portion corresponding to the wiring area (including the gap between the source electrode and the drain electrode) through a photolithography step and an etching step. Next, the silicon oxide film 13 which is an inter-layer insulating film is formed on the glass substrate 11 and the light shield film 12.

Next, the ITO film 14 and the metal film 15 are formed on the silicon oxide film 13 one by one and an opening (gap) is formed in the gate area in a photolithography step and an etching step. This opening is provided with a tapered surface whose width decreases toward the silicon oxide film 13 to improve the coverage of the film to be formed thereon. In the structure of this portion, it is essential that the edge of the ITO film 14 should extend outward more than the edge of the metal film 15 and tapering is preferably provided. Irradiating $PH_3$ plasma onto such a structure before forming the a-Si film which will be described later causes P atoms to be adsorbed to the surface of the ITO film 14. As a result, an ohmic characteristic is obtained between the a-Si and ITO.

Then, the a-Si film 16 and the silicon nitride film 17 are formed one by one on the metal film 15 having the opening and the a-Si film 16 and the silicon nitride film 17 are left in the gate area (gap, and source and drain electrodes around the gap) through a photolithography step and an etching step.

Next, the silicon nitride film 18 which is a gate insulating film is formed on the entire surface of the substrate. A metal film for the gate electrode 19 is further formed thereon. On top of it, the material of the organic material film 20 is coated thereon to form the organic material film 20. This organic material film 20 is patterned using a halftone mask 21.

Now, the photo-embossing material described in EP Patent Application No. 03102200.7 of the present applicant is used as the material of this organic material film 20. The entire disclosure of the content of this application is incorporated herein by reference in its entirety. This photo-embossing material is a material whose photo-sensitivity is lost by applying a baking step after exposure. When an organic material film having projections and depressions is formed using this photo-embossing material, it is possible to realize patterning by using an exposure step and a baking step. This eliminates the necessity for a developing step and makes it possible to omit wet processes.

This halftone mask 21 consists of a light shield portion 21a which shuts off light, a semi-transparent portion 21b which allows only part of light to pass and a transparent portion 21c which allows all light to pass. The transparent portion 21c of the halftone mask 21 is provided so as to correspond to the area of the gate insulating film where the contact hole is formed, the light shield portion 21 a is provided so as to correspond to the area including the convex portion of the IDR organic material film and the semi-concave portion of the IDR organic material film.

When the photo-embossing material is exposed to light using this halftone mask 21, as shown in FIG. 2, all exposure light passes through the transparent portion 21c and a part of the exposure light passes through the semi-transparent portion 21b. On the other hand, no exposure light passes through the light shield portion 21a. That is, most of the photo-embossing material of the area corresponding to the transparent portion 21c is removed and what remains is the thinnest of all. On the other hand, the photo-embossing material of the area corresponding to the semi-transparent portion 21b is partially removed. All of the photo-embossing materials of the area corresponding to the light shield portion 21a remain. A baking step is applied to the remaining organic material film 20a to harden the photo-embossing material. This results in the organic material film 20a having projections and depressions.

Next, a dry etching is applied to the organic material film 20a, the overall thickness of the organic material film 20a is reduced to expose the silicon nitride film 18 of a contact-hole-forming area X (formation of an opening). That is, the organic material film is left as shown with a dotted line in FIG. 2 through the dry etching. At this time, when the organic material film 20a remains on the silicon nitride film 18 of the contact-hole-forming area X, it is preferable to remove the organic material film 20a using ashing, etc.

Since this dry etching is performed to remove the organic material film 20a in the area in which the contact hole is formed, the used gas and conditions can be modified appropriately within a range in which this purpose can be achieved. Furthermore, the exposed silicon nitride film 18 (contact-hole-forming area) can be detected by an EPD (End Point Detector). Furthermore, it is possible to reduce the thickness of the organic material film 20a uniformly by carrying out a dry etching in an inductively coupled plasma (ICP) mode or a reactive ion etching (RIE) mode, and therefore the uneven shape can be kept after the dry etching. In this way, it is possible to prevent the diffuse reflection characteristic from being degraded.

Next, a dry etching is applied to the structure shown in FIG. 3 to form the contact hole 22 in the area in which the silicon nitride film 18 is exposed as shown in FIG. 4. At this time, etching is performed using the organic material film 20b as a mask.

Since this dry etching is performed to form the contact hole, the used gas and conditions can be modified within a range in which this purpose can be achieved appropriately.

Thus, patterning can be performed through exposure and baking, that is, using the photo-embossing material capable of patterning without development as the material of the IDR organic material film, it is possible to carry out all steps from the step of forming the organic material film having projections and depressions to the step of forming the contact hole for the insulating film of the base of the organic material film using dry processes (without any wet processes). Therefore, steps from the step of forming the organic material film to the step of forming the contact hole can be performed in a single apparatus, which improves throughput.

Next, as shown in FIG. 5, a metal film is coated on the reflective area (including the organic material film 20b and the side wall of the silicon nitride film 18 of the contact hole) to form the reflective electrode 23. Now, the area of the contact hole 22 also serves as a transmission area. Aluminum, etc., can be used as the material of the reflective electrode 23. Next, as shown in FIG. 6, using the same resist pattern of the reflective electrode 23, the metal film 15 is etched continuously and the ITO film 14 is exposed to form the transmission area. After the etching, the organic material film is peeled. In this way, the underlying electrode (metal film 15) and the reflective electrode 23 are connected through the contact hole. Using aluminum as the material of the reflective electrode 23 and a chromium molybdenum alloy as the material of the metal film 15, it is possible to use a single etchant, and therefore it is possible to use the same resist pattern of the reflective electrode 23 to dry-etch the metal film 15 continuously as described above.

In this way, an array substrate is created, an opposed substrate is created using a normal method and the array substrate and the opposed substrate are assembled to create a liquid crystal display device.

Thus, according to the method of this embodiment, an uneven organic material film is formed on an insulating film on an underlying electrode in a thin-film transistor of an active matrix type of liquid crystal display device using a photo-embossing material, the organic material film is dry etched, the film thickness of the organic material film is reduced, the insulating film of the contact-hole-forming area is exposed, the exposed insulating film is dry etched and a contact hole is formed.

The material constituting this organic material film can be patterned through exposure and baking without development, and therefore it is possible to realize steps from the step of forming the organic material film to the step of forming the contact hole without any wet processes. This eliminates the necessity for the cleaning/drying steps required in the developing step and can improve throughput. Furthermore, this method does not require any photolithography step to form the contact hole, thus the steps are not complicated. The liquid crystal display device obtained in this method can form an organic material film having projections and depressions on the surface, and can thereby exhibit the IDR effect as in the conventional art.

EMBODIMENT 2

This embodiment will describe a case where the present invention is applied to a terminal-forming position outside a panel. FIGS. 7 and 8 are sectional views showing steps of a method of manufacturing a liquid crystal display device according to Embodiment 2 of the present invention. In FIGS. 7 and 8, the left side from the dotted line is a panel area and the right side from the dotted line (outside the sealed area) is a terminal-forming area Y.

A silicon oxide film 13 is formed on a glass substrate, an ITO film 14 and a metal film 15 are formed thereon one by one and these films are patterned. At this time, patterning is performed so that the ITO film 14 and metal film 15, and gate electrode 19 do not overlap with each other. Patterning may also be performed so that the ITO film 14 and metal film 15, and gate electrode 19 overlap with each other. A silicon nitride film 18 is formed on the metal film 15, the gate electrode 19 is formed thereon and then an IDR organic material film is formed. Then, this organic material film is patterned through exposure and baking using a halftone mask as in the case of Embodiment 1 and then dry etched in such a way that an organic material film 20b is left. This causes the silicon nitride film 18 in the contact-hole-forming area X and terminal-forming area Y to be exposed.

Next, as shown in FIG. 8, the silicon nitride film 18 is dry etched using the organic material film 20b as a mask and then a reflective electrode 23 is formed thereon. This reflective electrode 23 is patterned so that the gate electrode 19 and the metal film 15 are connected. On the other hand, in the terminal-forming area Y, the silicon nitride film 18 is dry etched using the organic material film 20b as a mask, and then the metal film 15 is etched using the etched silicon nitride film 18 as a mask. A terminal is formed in this way.

The dry etching conditions, etc., are the same as those in Embodiment 1.

Thus, according to the method of this embodiment, an uneven organic material film is formed on an insulating film using a photo-embossing material, a dry etching is applied to the organic material film, the thickness of the organic material film is reduced, the insulating film of the contact-hole-forming area in the terminal-forming area is exposed and the exposed insulating film is dry etched to form a contact hole.

The material constituting this organic material film can be patterned through exposure and baking without development, and therefore it is possible to realize steps from forming the organic material film to forming the contact hole without any wet processes. This eliminates the necessity for the cleaning/drying steps required in the developing step and can improve throughput. Furthermore, this method does not require any photolithography step to form the contact hole, thus the steps are not complicated. The liquid crystal display device obtained in this method can form an organic material film having projections and depressions on the surface, and can thereby exhibit the IDR effect as in the conventional art.

The present invention is not limited to Embodiment 1, 2 and can be implemented with the material and the used gas, etc., modified in various ways. For example, the material and the structure used in Embodiments 1, 2 are not limited and it is possible to use an alternate material and an alternate structure which can exhibit the same functions. That is, Embodiments 1, 2 have explained the case where a silicon oxide film is used as an inter-layer insulating film, a silicon nitride film is used as a gate insulating film and a chromium film is used as a light shield film. However, in the present invention, any other materials can be used if they at least exhibit equivalent functions. Furthermore, the thickness of each film is not particularly limited if each film at least exhibits the function of the film.

Furthermore, Embodiments 1, 2 have explained the case where a halftone mask is used, but in the present invention, it is also possible to form an organic material film having a thick film section and opening by using a diffraction mask having a light shield portion, a transparent portion and a semi-transparent portion (micro pattern section equal to or smaller than a resolution limit). In the case of this diffraction mask, a small pattern equal to or smaller than a resolution limit of the exposure device is formed and this part is used as the semi-transparent portion. When light is diffracted with this small pattern, the weak light passes through the mask.

Embodiments 1, 2 have explained the case where the liquid crystal display device is of a transflective type, but the present invention is likewise applicable to a case where the liquid crystal display device is of a reflective type. The case of the reflective type is substantially the same as the case of the transflective type except that the light shield film is not necessary and the reflective electrode is also formed in the opening of the silicon nitride film, etc.

As described above, according to the method of manufacturing a liquid crystal display device, an organic material film having projections and depressions is formed using a photo-embossing material, on an insulating film on an underlying electrode in a thin-film transistor of an active-matrix liquid crystal display device, the insulating film in a contact-hole-forming-area is exposed by reducing a thickness of the organic material film due to a dry etching to the organic material film and a contact hole is formed by dry etching the exposed insulating film, and therefore patterning can be performed through exposure and baking without development. This makes it possible to realize steps from the step of forming the organic film to the step of forming the contact hole without any wet processes. This eliminates the necessity for the cleaning/drying steps required in the developing step, and can thereby improve throughput. Furthermore, this method eliminates the necessity for the photolithography step for forming the contact hole, thus the steps are not complicated.

INDUSTRIAL APPLICABILITY

The present invention is applicable to a reflective type of liquid crystal display device and a transflective type of liquid crystal display device.

The invention claimed is:

1. A method of manufacturing liquid crystal display device comprising the steps of:
    forming an organic material film having projections and depressions, using a photo-embossing material on an insulating film on an underlying electrode in a thin-film transistor of an active-matrix liquid crystal display device;
    exposing said insulating film in a contact-hole-forming-area by reducing a thickness of said organic material film by a day etching to said organic material film; and
    forming a contact hole by a dry etching to the exposed insulating film, wherein the projections and depressions of the organic material film are formed by subjecting the photo-embossing material to a mask and exposure to light, wherein the projections and depressions in the organic material film include a thinnest region corresponding to the contact-hole-forming area.

2. A method as claimed in claim 1, further comprising the steps of:
    exposing said underlying electrode in forming said contact hole; and
    contacting the exposed underlying electrode with a reflective electrode by forming said reflective electrode on the resulting structure.

3. A method as claimed in claim 1, wherein said photo-embossing material is a material patternable by an exposing step and a baking step.

4. A method as claimed in claim 3, wherein said organic material film is formed by exposing and baking said photo-embossing material in forming said organic material film.

5. A method as claimed in claim 4, wherein a halftone mask or a diffraction mask is used in exposing.

6. A method as claimed in claim 1, wherein dry processes are performed from the step of forming said organic material film to the step of forming said contact hole.

7. A method as claimed in claim 1, wherein the step of exposing said insulating film and the step of forming said contact hole are performed in a single apparatus.

8. A method as claimed in claim 1, wherein the dry etching in the step of exposing said insulating film is performed in an Inductively Coupled Plasma mode or a reactive ion etching mode.

9. A method as claimed in claim 1, wherein said liquid crystal display device is a reflective type of liquid crystal display device or a transflective type of liquid crystal display device.

10. A method as in claim 1, wherein the mask comprises a light shield portions corresponding to the projections, semi-transparent regions corresponding to the depressions, and a transparent portion corresponding to the thinnest region in the organic material film.

11. A method as in claim 1, wherein the insulating film is exposed by dry etching the thinnest region of the organic material film.

12. A method of manufacturing a liquid crystal display device comprising:
    forming a thin-film transistor on a substrate;
    forming an insulating film over the thin-film transistor;
    disposing an organic material film above the insulating film;

forming projections and depressions in the organic material film, including a thinnest region corresponding, to a contact-hole-forming-area;

dry etching the thinnest region of the organic material film to expose a region of the insulating film; and dry etching the exposed region of the insulating film to form a contact hole.

13. The method as in claim 12, wherein the organic material film comprises a photo-embossing material, wherein the projections and depressions are formed by subjecting the photo-embossing material to a mask and exposure to light.

14. The method as in claim 13, wherein the mask comprises a light shield portions corresponding to the projections, semi-transparent regions corresponding to the depressions, and a transparent portion corresponding to the thinnest region in the organic material film.

15. The method as in claim 12, further comprising the steps of forming an electrode layer below the insulating layer, wherein a region of the electrode is exposed after the contact hole is formed; and forming a reflective electrode above the projections and depressions and the exposed region of the electrode layer, wherein the reflective electrode contacts the exposed region of the electrode layer.

16. The method as in claim 12, wherein only dry processes are performed from forming said projections and depressions in the organic material film to forming said contact hole.

17. The method as in claim 12, wherein dry etching the thinnest region of the organic material film and dry etching the exposed region of the insulating film axe performed in a single apparatus.

18. The method as in claim 12, wherein dry etching to expose the insulating film is performed in an inductively coupled plasma mode or a reactive ion etching mode.

19. The method as in claim 12, wherein said liquid crystal display device is a reflective type liquid crystal display device or a transflective type of liquid crystal display device.

\* \* \* \* \*